(12) United States Patent
Carapelli

(10) Patent No.: US 10,912,416 B2
(45) Date of Patent: Feb. 9, 2021

(54) GRINDING DEVICE FOR GRINDABLE PRODUCTS

(71) Applicant: DROGHERIA E ALIMENTARI S.P.A., Florence (IT)

(72) Inventor: Giacinto Carapelli, Florence (IT)

(73) Assignee: DROGHERIA E ALIMENTARI S.P.A., Florence (IT)

( * ) Notice: Subject to any disclaimer, the term of this patent is extended or adjusted under 35 U.S.C. 154(b) by 581 days.

(21) Appl. No.: 15/313,417

(22) PCT Filed: May 26, 2015

(86) PCT No.: PCT/IB2015/053918
§ 371 (c)(1),
(2) Date: Nov. 22, 2016

(87) PCT Pub. No.: WO2015/181712
PCT Pub. Date: Dec. 3, 2015

(65) Prior Publication Data
US 2017/0095121 A1     Apr. 6, 2017

(30) Foreign Application Priority Data

May 26, 2014 (IT) .............................. MI2014A0957

(51) Int. Cl.
*A47J 42/02* (2006.01)
*A47J 42/04* (2006.01)
(Continued)

(52) U.S. Cl.
CPC ............... *A47J 42/02* (2013.01); *A47J 42/04* (2013.01); *A47J 42/06* (2013.01); *A47J 42/08* (2013.01); *A47J 42/10* (2013.01); *A47J 42/12* (2013.01)

(58) Field of Classification Search
CPC .. A47J 42/12; A47J 42/08; A47J 42/02; A47J 42/04; A47J 42/06; A47J 42/10
(Continued)

(56) References Cited

U.S. PATENT DOCUMENTS

| 4,960,246 A | * | 10/1990 | Fohrman | ................ | A47J 42/04 241/169.1 |
| 6,929,201 B1 | * | 8/2005 | Blouse | .................... | A47J 42/04 241/168 |

(Continued)

FOREIGN PATENT DOCUMENTS

| CN | 2186026 | 12/1994 |
| CN | 1822785 | 8/2006 |

(Continued)

OTHER PUBLICATIONS

Russian Search Report issued in counterpart Russian application (2 pages).

(Continued)

*Primary Examiner* — Kenneth E Peterson
*Assistant Examiner* — Nhat Chieu Q Do
(74) *Attorney, Agent, or Firm* — Greenblum & Bernstein, P.L.C.

(57) ABSTRACT

A grinding device for grindable products includes movable and fixed grinding assemblies. The movable grinding assembly includes a rotationally integral casing and a grinder including a grinding cone with a grinding surface. The fixed grinding assembly includes a counter-grinder and a coupling member. The casing includes a cylindrical jacket and is closed at one end, including openings for dispensing a ground product. The counter-grinder has a hollow cylindrical body with an inner grinding surface. The grinder is inserted into the hollow cylindrical body of the counter-grinder to allow the respective grinding surfaces to cooper- (Continued)

ate. The coupling member includes an open ended cylindrical body connecting with the container and an adjustment portion cooperating with the casing for adjusting the movable grinding assembly with respect to the fixed grinding assembly. The grinder and the counter-grinder are substantially rigid, and the casing and the coupling member are substantially flexible.

16 Claims, 2 Drawing Sheets

(51) Int. Cl.
  *A47J 42/08*  (2006.01)
  *A47J 42/06*  (2006.01)
  *A47J 42/10*  (2006.01)
  *A47J 42/12*  (2006.01)

(58) Field of Classification Search
  USPC .............................................. 241/100, 169.1
  See application file for complete search history.

(56) References Cited

U.S. PATENT DOCUMENTS

| | | | |
|---|---|---|---|
| 7,878,437 B2 * | 2/2011 | Rice | A47J 42/08 |
| | | | 241/189.1 |
| 2006/0278746 A1 * | 12/2006 | Delbridge | A47J 42/04 |
| | | | 241/169.1 |
| 2008/0315022 A1 * | 12/2008 | Wilson | A47J 42/08 |
| | | | 241/169.1 |
| 2010/0044485 A1 * | 2/2010 | Delbridge | A47J 42/08 |
| | | | 241/169.1 |
| 2010/0187243 A1 * | 7/2010 | Layer | A61J 1/035 |
| | | | 220/694 |
| 2010/0187343 A1 * | 7/2010 | Stasin | A47J 42/04 |
| | | | 241/169.1 |
| 2012/0006922 A1 * | 1/2012 | Wilson | A47J 42/08 |
| | | | 241/169.1 |
| 2014/0070038 A1 * | 3/2014 | Wade | A47J 42/18 |
| | | | 241/100 |
| 2014/0224910 A1 * | 8/2014 | Sahli | A47J 42/06 |
| | | | 241/246 |
| 2016/0045071 A1 * | 2/2016 | Sahli | A47J 31/42 |
| | | | 241/261.2 |

FOREIGN PATENT DOCUMENTS

| | | | |
|---|---|---|---|
| CN | 200939067 | 8/2007 | |
| CN | 201624548 | 11/2010 | |
| CN | 201879519 | 6/2011 | |
| DE | 200 00 353 U1 | 5/2000 | |
| EP | 1 696 775 B1 | 1/2008 | |
| EP | 2 510 845 A1 | 10/2012 | |
| FR | 2 917 589 A1 | 12/2008 | |
| WO | 2004/037057 A1 | 5/2004 | |
| WO | WO-2004037057 A1 * | 5/2004 | ............. A47J 42/08 |

OTHER PUBLICATIONS

European Examination document and Search Report issued in counterpart EPO application (7 pages).

Chinese Office Action issued in counterpart Chinese application (8 pages).

International Search Report for corresponding International Patent Application No. PCT/IB2015/053918 dated Sep. 23, 2015, 2 pgs.

* cited by examiner

GRINDING DEVICE FOR GRINDABLE PRODUCTS

This application is a National Stage Application of PCT/IB2015/053918, filed 26 May 2015, which claims benefit of Serial No. MI2014A000957, filed 26 May 2014 in Italy and which applications are incorporated herein by reference. To the extent appropriate, a claim of priority is made to each of the above disclosed applications.

BACKGROUND OF THE INVENTION

The present invention relates to a grinding device for grindable products, such as dried spices and herbs, dried mushrooms, chocolate, coffee and the like.

Various types of grinders for pepper or other spices are known. In these devices, the grinding occurs due to the friction between a fixed part and a movable part. On the respective contact surfaces, the two parts have a toothing or sharp-edged corrugations which are intended to frictionally grind a product (e.g. peppercorns). Said surfaces are not actually in contact but are spaced apart, so as to create a gap therebetween, which determines the final grain size of the ground product. The grinding occurs by rotating the movable part with respect to the fixed part, so that the product pieces are "trapped" between the teeth of the grinder and are finely crushed by them up to the desired size.

The requirement to grind products of various type (such as various spices, dried mushrooms, chocolate, coffee, etc.) and often of irregular size has given rise to the need to optimize the profile of the grinder and counter-grinder toothing, so as to avoid more or less large product pieces from getting stuck between the teeth. However, this type of grinders, which have been commercially available for a number of years, does not allow the grinding grain size to be varied, which however may be desirable in certain cooking applications.

European patent EP 1 696 775 B1 solves this problem by providing a grinder in which the distance between the grinding surfaces may be adjusted by axially sliding the grinder with respect to the counter-grinder.

However, in practice, such a solution has some drawbacks. In fact, especially after a more or less prolonged use, the snap-sliding movement of the grinder with respect to the counter-grinder tends to stiffen, until it locks in one of the adjustment positions.

European patent EP 2 510 845 B1 to the same Applicant suggests a solution for the aforesaid problem, consisting in using a flexible material for the outer casing of the grinding tool intended to snap-cooperate with the tooth present on the fixed grinder, which necessarily must be made of a rigid material instead, so as to allow the product to be ground.

However, such a solution also has some limitations in use, especially when dust or product residues penetrate between the teeth and grooves of the adjustment system thus causing the partial or total blockage thereof.

SUMMARY OF THE INVENTION

The present invention overcomes the problems of the prior art by providing an all-purpose grinding device, adapted to grind all grindable products, and provided with a particularly efficient adjustment of the grain size of the ground product.

Such a result has been achieved by a grinding device as set forth in the appended claims, the definitions of which form an integral part of the present description.

BRIEF DESCRIPTION OF THE DRAWINGS

The features and advantages of the grinding device according to the present invention will become more apparent from the description of some preferred embodiments thereof, provided below by way of non-limiting example, with reference to the accompanying drawings, in which.

DETAILED DESCRIPTION OF THE DRAWINGS

Figure 1:
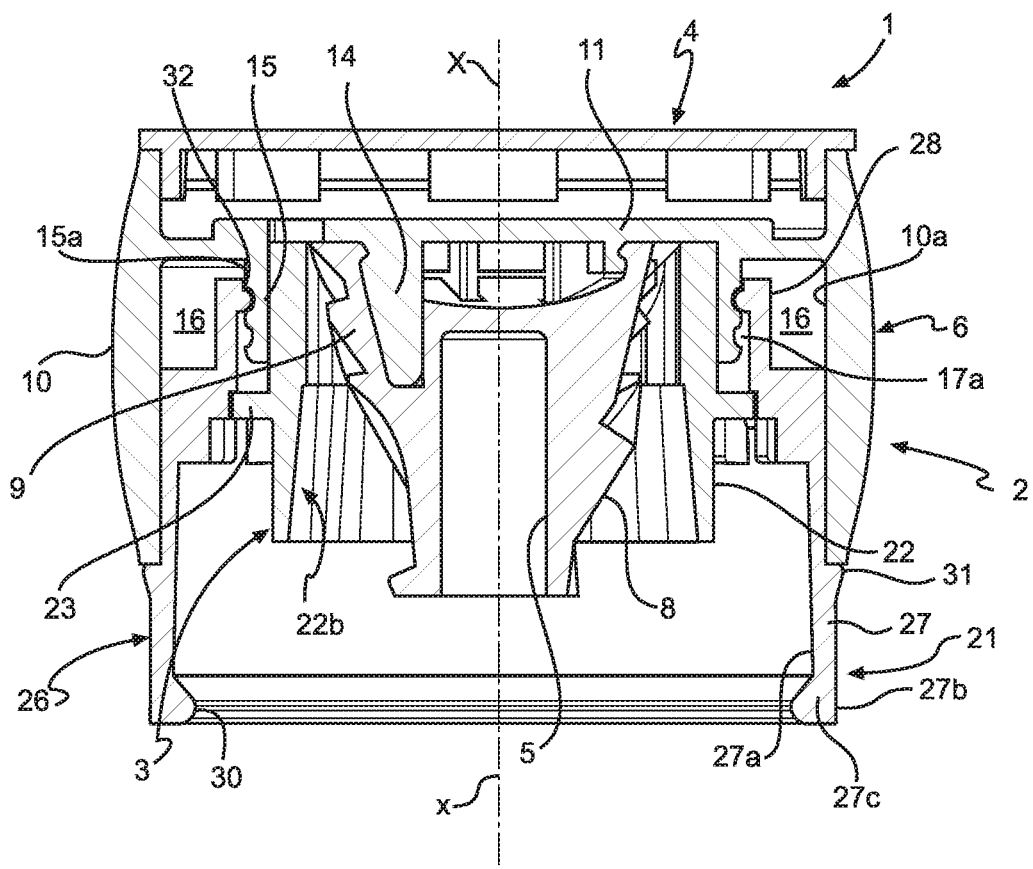
FIG. 1 depicts a side sectional view of the grinding device according to the invention.
Figure 3:
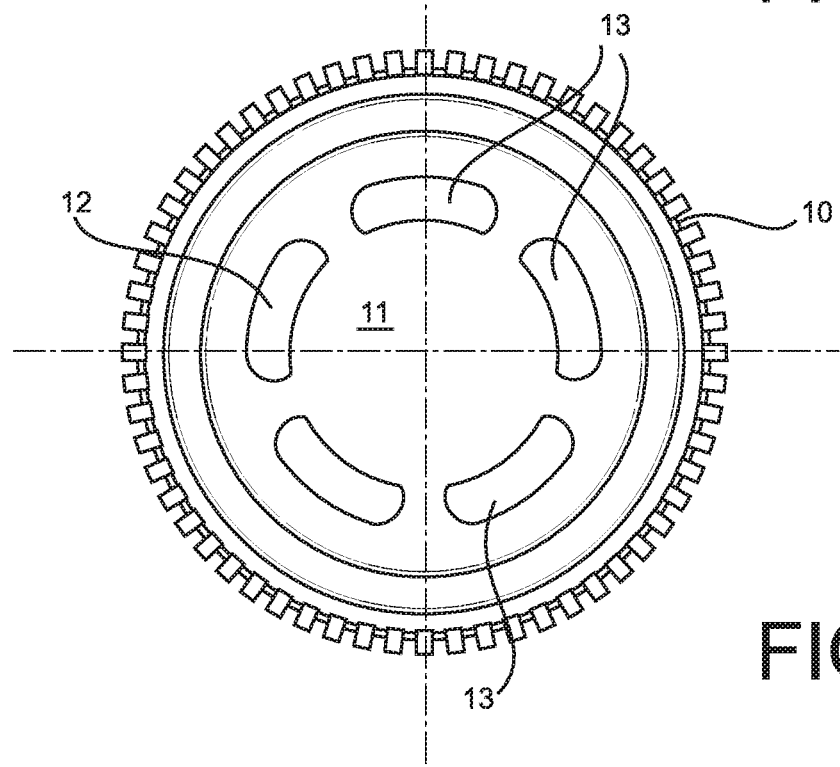
FIG. 3 depicts a top view of the grinding device according to the invention.
Figure 2:
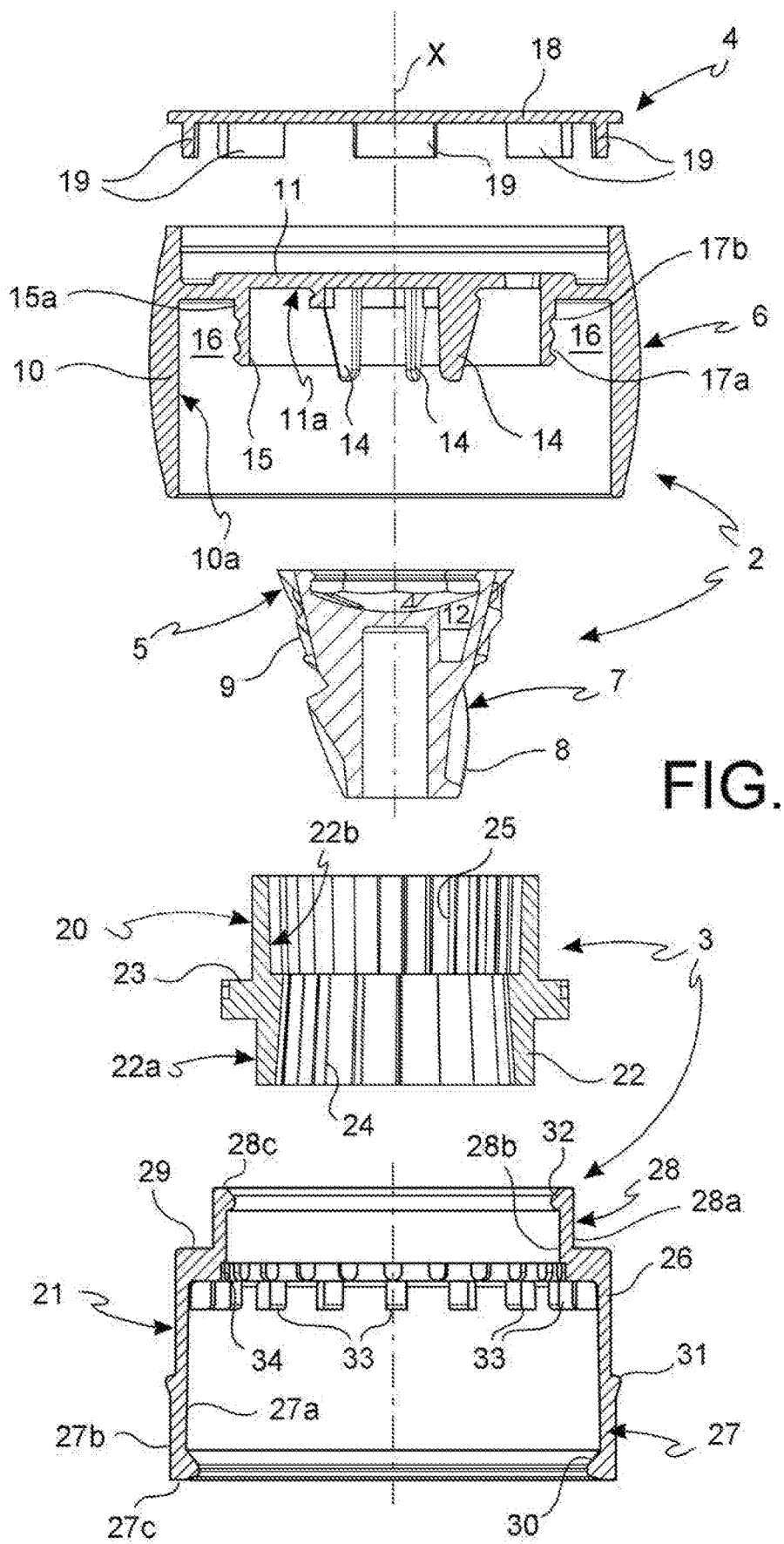
FIG. 2 depicts an exploded side sectional view of the device in FIG. 1.

With reference to the figures, the grinding device of the present invention, indicated by reference numeral 1 as a whole, comprises a movable grinding assembly 2, a fixed grinding assembly 3, intended to engage the neck of a container (not shown) of a product to be ground, typically spices, and a lid 4.

The movable grinding assembly 2 comprises a grinder 5 and a casing 6.

Grinder 5 comprises a grinding cone provided with a grinding surface 7.

The grinding surface 7 comprises a first series 8 and a second series 9 of ribs, in which the ribs of said second series 9 have a pitch and a height which are smaller than those of the ribs of said first series 8. Moreover, the ribs of said second series 9 preferably cover only that part of the grinding surface which is close to the cone base (upper portion in the figures).

In the preferred embodiment of the invention, at least one of such series of ribs has ribs with a substantially helical profile.

The cone base of grinder 5 has blind openings which open into one or more recesses 12. The recesses 12 are obtained in the body of grinder 5 and develop in a direction which is substantially parallel to axis X.

Casing 6 comprises a cylindrical jacket 10 which develops about an axis X. In one embodiment, the outer surface of jacket 10 is knurled so as to improve the user's grip.

Jacket 10 is open at one end, while close to the opposite end it is closed by a discoid surface 11.

The discoid surface 11 has a series of openings 13 for dispensing the ground product. The openings 13 are shaped as an arcuate slot and are arranged along an outer circumference with respect to the cone base of grinder 5. Such a shape prevents the grains of product having a larger size than that desired from escaping from the grinding device.

One or more teeth 14 protrude from the inner face 11a of the discoid surface 11, i.e. the face facing the open end of jacket 10. The teeth 14 and the recesses 12 of grinder 5 are equal in number, the teeth 4 are arranged in a corresponding position and are shaped so as to be interlocked with such recesses (FIG. 1). Thereby, grinder 5 may be assembled inside casing 6 so as to rotate about axis X and integrally therewith.

A circular crown 15 further extends from the inner face 11a of the discoid surface 11. The circular crown 15 is substantially cylindrical, develops along axis X, therefore parallel to jacket 10, and has a smaller diameter than that of jacket 10, so as to create an annular gap 16 between the inner surface 10a of jacket 10 and the outer surface 15a of the circular crown 15.

The outer surface 15a of the circular crown 15 has two or more (two in the embodiment shown in the figures) annular grooves 17a, 17b.

Lid 4 comprises a disc 18, a plurality of tabs extending from a face thereof. The tabs 19 are arranged along an inner circumference with respect to the edge of disc 18 and, in the embodiment of the figures, have a substantially rectangular profile, but in other embodiments they could have different profiles. The circumference along which the tabs 19 are arranged has a diameter which substantially corresponds to the inner diameter of jacket 10, so as to interfere with the inner surface 10a of the latter and ensure a proper stability of the closure.

The fixed grinding assembly 3 comprises a counter-grinder 20 and a member 21 for the coupling with a container of the product to be ground (not shown).

The counter-grinder 20 comprises a cylindrical body 22 which has an outer surface 22a and an inner surface 22b.

A circular flange 23 which forms a coupling element with the coupling member 21 departs perpendicularly from the outer surface 22a.

The inner surface 22b of the counter-grinder 20 defines a grinding surface on which a first series 24 and a second series 25 of ribs are present, being placed at said first series 8 and second series 25 of ribs of said grinder 5, respectively. The ribs of said second series 25 have a pitch and a height which are smaller than those of the ribs of said first series 24.

The ribs preferably have a sawtooth profile, i.e. with an oblique side and a vertical side, forming a sharp edge at the apex.

In the preferred embodiment of the invention, the grinding surface of the counter-grinder 20 has two truncated-cone sections converging towards the center so as to form a substantially hourglass-shaped surface, the first of said sections comprising said first series 24 of ribs and the second of said sections comprising said second series 25 of ribs.

In any case, again, the inner diameter of the counter-grinder 20 is such as to form a gap between its grinding surface and the grinding surface of grinder 5, in order to allow the particles of the product to be ground to be trapped between the teeth and, once they have been ground, to fall towards the openings 13. Moreover, due to the hourglass shape of the grinding surface of the counter-grinder 20, the gap formed between the first series 8, 24 of ribs of grinder and counter-grinder is funnel-shaped, thus allowing the product to be ground to be conveyed towards the grinding zone and fed downwards by gravity, as it is chopped into increasingly smaller grains.

The coupling member 21 comprises an open-ended cylindrical body 26 which develops along axis X and has a portion 27 for the connection with a container (not shown) of the product to be ground and an adjustment portion 28.

The adjustment portion 28 has a smaller diameter than the connection portion 27, whereby a shoulder 29 is formed between said portions 27, 28. In particular, the inner diameter of the adjustment portion 28 substantially corresponds to the outer diameter of the circular crown 15, so as to cooperate with the surface of the latter.

The connection portion 27 comprises an inner surface 27a, an outer surface 27b and a connecting edge 27c arranged at the open end. An annular ridge 30 is arranged on the inner surface 27a, close to the connecting edge 27c. Such an annular ridge 30 allows the coupling member 21 to be assembled and snap-locked onto the neck of a spice container (not shown), which is typically made of glass and will have a corresponding seat to accommodate the annular ridge 30.

However, a screw fastening system may be provided by including a threaded portion of the inner surface 27a of the coupling member 21 and a corresponding threaded surface on the container neck. However, the first solution is preferred, since it avoids the grinding device from being unscrewed and thus accidentally removed from the container when rotating the grinder in use.

A step 31 acting as a resting surface for the lower end of the jacket 10 of casing 6 is arranged on the outer surface 27b of the connection portion 27 (FIG. 1).

The adjustment portion 28 comprises an outer surface 28a, an inner surface 28b and a connecting edge 28c arranged at the open end. An annular ridge 32 is arranged on the inner surface 28b, close to the connecting edge 28c, which annular ridge 32 has such a shape and size as to be coupled to the annular grooves 17a, 17b present on the circular crown 15 of casing 6.

It is preferred that both the annular ridge 32 and the annular grooves 17a, 17b have a beveled profile so as to facilitate their mutual snap-coupling and the sliding movement thereof.

The inner surface 28b of the adjustment portion further comprises, at the connecting point with the connection portion 27, a plurality of teeth 33 arranged circumferentially and a step 34 which provides the flange 23 of the counter-grinder 20 with an abutment surface. On the other hand, the teeth 33 have the function of cooperating with the outer surface 22a of the counter-grinder 20 thus facilitating the retention thereof in the coupling position with the coupling member 21.

According to a particular aspect of the present invention, grinder 5 and counter-grinder 20 are made of a substantially rigid material, preferably a plastic material, while casing 6 and coupling member are made of a substantially flexible material, also in this case a plastic material being preferred. Preferably, the rigid plastic is an acetal resin (POM), while the flexible plastic is polypropylene (PP). Thereby, the annular ridge 32 and the walls of the annular grooves 17a, 17b may mutually slide without fear of seizure even in case of dust or small product granules penetrating therebetween.

The grinding device according to the invention is assembled as follows.

Grinder 5 is coupled to casing 6 by interlocking the teeth 14 into the respective recesses 12. The coupling member 21 is then placed to engage the annular ridge 32 with one of the annular grooves 17a, 17b. Finally, the counter-grinder 20 is inserted from below so that it abuts against step 34.

Lid 4 may then be placed to close the grinding device.

When the grinding device is assembled, the movable grinding assembly 2 straddles the counter-grinder 20, with casing 6 being placed outside to be grasped by the user and the cone of grinder 5 being inserted into the central recess of the counter-grinder 20.

The movable grinding assembly 2 which integrally assembles grinder 5 with casing 6, as described above, can thus carry out two movements: (i) a rotary movement with respect to the counter-grinder, which is the movement responsible for grinding; (ii) an axial movement along axis X between various adjustment positions defined by the position and number of the annular grooves 17a, 17b present on the outer surface 15a of the circular crown 15. The latter axial movement is discontinuous, since it implies the snap engagement of the annular ridge 32 with an annular groove 17a, 17b or with the next groove.

Typically, two or three annular grooves 17a, 17b will be present.

The operation of the grinding device of the invention is as follows.

When the container is turned upside down, the grains, e.g. peppercorns, are conveyed into the space between the grinding surfaces of grinder 5 and counter-grinder 20. In such a zone, a first coarse grinding occurs, which is obtained by rotating the movable grinding assembly 2 about the longitudinal axis X. Thereby, indeed, the grains are trapped between the ribs 8, 9 of grinder 5 and the ribs 24, 25 of counter-grinder 20, and are then frictionally crushed. The grain size of the ground product is a function of the width of the gap between the two grinding surfaces, through which the partially ground grains are fed by gravity towards the dispensing openings 13, thus obtaining an increasingly finer grinding.

In fact, the distance between the grinding surfaces is smaller at the second ribs 9, 25 and the number of ribs is higher. This contributes to the fine grinding of the product.

Typically, the rotary movement of the grinding assembly 2 about axis X is an alternating movement in a clockwise-counterclockwise direction. While the movement in one direction causes the grain grinding, the movement in the other direction frees them from the trap between the ribs, thus allowing them to fall by gravity into the next zone or outwards.

As stated above, the distance between the grinding surfaces determines the grain size of the ground product. For this reason, the grinding device of the invention has various adjustment possibilities, which are obtained by axially moving the movable grinding assembly 2 with respect to the fixed grinding assembly 3, so that the annular ridge 32 occupies either a first, a second, or, if needed, a further annular groove 17a, 17b. Thereby, the distance between the grinding surfaces is changed.

The grinding device of the invention has several advantages.

Adjusting the movable grinding assembly 2 with respect to the counter-grinder 20 allows various grinding levels of the same product to be obtained or the same grinding tool to be used for products of different type, such as dried fruits or mushrooms, which require a different grinding grain size.

The fact that grinder 5 and counter-grinder 20 are made of rigid plastic, thus suitable for grinding, and that casing 6 and coupling member 21 are made of flexible plastic, has the advantage that, even if the complexity of the device is increased, the axial sliding movement of the grinding assembly 2 is made highly smoother and easier to be adjusted, much more than the prior version in which there was a cooperation between flexible surfaces and rigid surfaces, which led in some cases (penetration of dust or fine grounded product between the mutually sliding surfaces) to the seizure of the device.

It is apparent that the above description relates only to a particular embodiment of the grinding device of the invention, and those skilled in the art will be able to make all changes required to adapt it to particular applications, without however departing from the scope of protection of the present invention.

The invention claimed is:
1. A grinding device configured to be mountable onto a container, comprising:
   a movable grinding assembly, comprising:
      a grinder;
      a casing that is a separate member from the grinder and comprises a first adjustment portion;
   a fixed grinding assembly comprising;
      a coupling member configured to engage with a container and comprising a second adjustment portion; and
      a counter-grinder that is a separate member from the coupling member and that can receive therein the grinder;
   said grinder comprising a grinding cone having an external grinding surface;
   said casing being configured to engage with the grinder and rotate about an axis of the coupling member and said casing comprising a discoid surface on which are arranged openings for dispensing a ground product; and
   said counter-grinder comprising a hollow cylindrical body having an outer surface and an internal grinding surface,
   wherein the first adjustment portion comprises a circular crown that, when the grinding device is installed on the container while in an upright position, projects downwards from the discoid surface and is located between an inner surface of the second adjustment portion and an outer surface of the counter-grinder,
   wherein the first adjustment portion cooperates with the second adjustment portion to provide axial adjustment between the movable grinding assembly and the fixed grinding assembly,
   wherein, when the grinding device is installed on the container while in an upright position, the first and second adjustment portions are located axially above a location where an outer surface of the counter-grinder forms a retention engagement with an inner surface of the coupling member, and
   wherein the grinder and the counter-grinder are made of a first rigid material and the casing and the coupling member are made of a second material that is a more flexible material than the first material.

2. The grinding device of claim 1, wherein the first rigid material is an acetal resin and the second more flexible material is polypropylene.

3. The grinding device of claim 1, wherein the external grinding surface of the grinder comprises a first series of ribs and a second series of ribs, wherein the second series of ribs have a pitch and a height which are smaller than a pitch and a height of the first series of ribs.

4. The grinding device of claim 3, wherein the internal grinding surface of said counter-grinder comprises a first series of ribs and a second series of ribs, the second series of the counter-grinder having a pitch and a height which are smaller than a pitch and a height of the first series of ribs.

5. The grinding device of claim 1, wherein the grinder comprises one or more recesses configured to receive one or more projecting teeth of the casing.

6. The grinding device of claim 5, wherein the one or more recesses and one or more projecting teeth interlock with one another.

7. The grinding device of claim 5, wherein the one or more recesses and one or more projecting teeth have corresponding shapes.

8. The grinding device of claim 1, wherein the circular crown extends from an inner face of the discoid surface that together with a circular surface of the coupling member defines an annular gap.

9. The grinding device of claim 8, wherein the first adjustment portion comprises two or more annular grooves arranged on the circular crown.

10. The grinding device of claim 1, wherein the coupling member comprises an inner surface, an outer surface, a connecting edge arranged at an open end, an annular ridge arranged on the inner surface and configured to snap-lock onto a neck of the container.

11. The grinding device of claim 1, wherein the casing comprises a step arranged on an outer surface and configured to act as a resting surface for a lower end of a jacket portion of the casing.

12. The grinding device of claim 1, wherein the second adjustment portion comprises an annular ridge and the first adjustment portion comprises annular grooves.

13. The grinding device of claim 12, wherein the annular ridge and the annular grooves have a beveled profile to facilitate mutual snap-coupling and sliding movement thereof.

14. The grinding device of claim 1, wherein the coupling member comprises a plurality of teeth arranged circumferentially and a step that is configured to engage with a flange of the counter-grinder.

15. A grinding device configured to be mountable onto a container, comprising:
  a movable grinding assembly comprising:
    a casing comprising a first adjustment portion and a discoid surface on which are arranged openings for dispensing a ground product;
    a grinder connectable to the casing so as to rotate therewith and comprising a cone-shaped grinding surface;
  a fixed grinding assembly arranged coaxially with the movable grinding assembly and comprising:
    a coupling member configured to engage with a container and comprising a second adjustment portion; and
    a counter-grinder that is mountable inside the coupling member so as to be prevented from rotating relative thereto and that can receive therein the grinder,
  wherein the first adjustment portion comprises a circular crown that, when the grinding device is installed on the container while in an upright position, projects downwards from the discoid surface and is located between an inner circumferential surface of the second adjustment portion and an outer circumferential surface of the counter-grinder,
  wherein the first adjustment portion cooperates and rotatably engages with the second adjustment portion to provide axial adjustment between the movable grinding assembly and the fixed grinding assembly,
  wherein, when the grinding device is installed on the container while in an upright position, the first and second adjustment portions are located axially above a location where an outer surface of the counter-grinder forms a retention engagement with an inner surface of the coupling member, and
  wherein the grinder and the counter-grinder are made of a first material and the casing and the coupling member are made of a more flexible second material.

16. A grinding device configured to be mountable onto a container, comprising:
  a movable grinding assembly comprising:
    a casing comprising a first adjustment portion and a discoid surface on which are arranged openings for dispensing a ground product;
    a grinder connectable to the casing so as to rotate therewith and comprising a cone-shaped grinding surface;
  a fixed grinding assembly comprising:
    a coupling member configured to engage with a container and comprising a second adjustment portion; and
    a counter-grinder that is mountable inside the coupling member so as to be prevented from rotating relative thereto and that can coaxially receive therein the grinder,
  wherein the first adjustment portion comprises an annular member that, when the grinding device is installed on the container while in an upright position, projects downwards from the discoid surface and is located between an inner cylindrical surface of the second adjustment portion and an outer cylindrical surface of the counter-grinder,
  wherein the first adjustment portion cooperates with the second adjustment portion to provide axial adjustment between the movable grinding assembly and the fixed grinding assembly,
  wherein, when the grinding device is installed on the container while in an upright position, the first and second adjustment portions are located axially above a location where an outer surface of the counter grinder forms a retention engagement with an inner surface of the coupling member, and
  wherein the grinder and the counter-grinder are made of a first material and the casing and the coupling member are made of a second material that is more flexible than the first material.

\* \* \* \* \*